US010283965B2

(12) United States Patent
Dong et al.

(10) Patent No.: US 10,283,965 B2
(45) Date of Patent: May 7, 2019

(54) METHOD FOR INCORPORATING NON-OPERATING STATION INTO OPERATING SYSTEM IN MULTI-TERMINAL FLEXIBLE DC TRANSMISSION SYSTEM

(71) Applicants: NR ELECTRIC CO., LTD, Nanjing (CN); NR ENGINEERING CO., LTD, Nanjing (CN)

(72) Inventors: Yunlong Dong, Nanjing (CN); Gang Li, Nanjing (CN); Jie Tian, Nanjing (CN); Nannan Wang, Nanjing (CN); Chao Liu, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 493 days.

(21) Appl. No.: 15/504,323

(22) PCT Filed: Apr. 18, 2014

(86) PCT No.: PCT/CN2014/075653
§ 371 (c)(1),
(2) Date: Feb. 16, 2017

(87) PCT Pub. No.: WO2014/131373
PCT Pub. Date: Sep. 4, 2014

(65) Prior Publication Data
US 2017/0207630 A1    Jul. 20, 2017

(30) Foreign Application Priority Data
Feb. 26, 2013  (CN) .......................... 2013 1 0059767

(51) Int. Cl.
*H02J 3/36*    (2006.01)
*H02J 1/10*    (2006.01)
*H02M 5/42*    (2006.01)

(52) U.S. Cl.
CPC .................. *H02J 3/36* (2013.01); *H02J 1/10* (2013.01); *H02M 5/42* (2013.01); *Y02E 40/16* (2013.01); *Y02E 60/60* (2013.01)

(58) Field of Classification Search
CPC ..... H02J 3/36; H02J 1/10; H02M 5/42; Y02E 40/16; Y02E 60/60
See application file for complete search history.

(56) References Cited

U.S. PATENT DOCUMENTS 9,906,160 B2 *   2/2018  Ackermann ............ H02M 1/36
2012/0092904 A1 *  4/2012  Nuqui ....................... H02J 3/36
                                                            363/35

(Continued)

FOREIGN PATENT DOCUMENTS

CN     101242087 A     8/2008
CN     201674227 U    12/2010
(Continued)

OTHER PUBLICATIONS

Zhao, Wanjun et al., "Engineering Technology of High Voltage Direct Current Transmission", China Electric Power Press, vol. ISBN 7-5083-1999-0, Aug. 31, 2004, pp. 1, 6, 27, 473.*

(Continued)

*Primary Examiner* — Jue Zhang
*Assistant Examiner* — Lakaisha Jackson
(74) *Attorney, Agent, or Firm* — Gokalp Bayramoglu

(57) ABSTRACT

A method for incorporating a non-operating station into an operating system in a multi-terminal flexible DC transmission system. The method includes selecting a STATCOM operation mode for the non-operating station; opening a bypass switch at an AC side and connecting a charging resistor to an AC line; closing the AC incoming-line breaker, and pre-charging a converter valve of the non-operating station through the resistor; closing the bypass switch after (Continued)

the pre-charging; selecting a constant-DC voltage control mode for the non-operating station to perform deblocking; controlling the difference between a non-operating station DC voltage value and an operating system direct voltage value to be within an allowable range; closing the pole-connection device at the DC side of a converter of the non-operating station; and switching the non-operating station from the STATCOM operation mode to a DC operation mode, and incorporating the non-operating station into the operating system.

8 Claims, 2 Drawing Sheets

(56) References Cited

U.S. PATENT DOCUMENTS

| | | | | |
|---|---|---|---|---|
| 2012/0146592 | A1* | 6/2012 | Ackermann | H02M 1/36 320/166 |
| 2013/0170255 | A1* | 7/2013 | Mukherjee | H02J 3/36 363/35 |
| 2013/0334887 | A1* | 12/2013 | Linden | H02J 1/12 307/82 |
| 2016/0308359 | A1* | 10/2016 | Dong | H02J 1/102 |
| 2017/0207630 | A1* | 7/2017 | Dong | H02J 3/36 |

FOREIGN PATENT DOCUMENTS

| | | |
|---|---|---|
| CN | 102510050 A | 6/2012 |
| CN | 103138281 A | 6/2013 |

OTHER PUBLICATIONS

Kong, Ming et al., "Pre-charging Control Strategies of Modular Multilevel Converter for VSC-HVDC", Power System Technology, vol. 35, No. 11, Nov. 30, 2011, pp. 67-72.*

Zhao, Wanjun et al., "Engineering Technology of High Voltage Direct Current Transmission", China Electric Power Press, vol. ISBN 7-5083-1999-0, Aug. 31, 2004, pp. 1, 6, 27, 473 (Translated).*

Kong, Ming et al., "Pre-charging Control Strategies of Modular Multilevel Converter for VSC-HVDC", Power System Technology, vol. 35, No. 11, Nov. 30, 2011, pp. 67-72 (Translated).*

Zhao, Wanjun et al., "Engineering Technology of High Voltage Direct Current Transmission", China Electric Power Press, vol. ISBN 7-5083-1999-0, Aug. 31, 2004 (Aug. 31, 2004). the text, p. 1, paragraph 2, p. 6, penultimate paragraph, p. 27, paragraph 1, and p. 473, fifth to last paragraph to fourth to last paragraph,and figure 2-1.

Kong, Ming et al., "Pre-charging Control Strategies of Modular Multilevel Converter for VSC-HVDC", Power System Technology, vol. 35, No. 11, Nov. 30, 2011 (Nov. 30, 2011) pp. 67-72.

* cited by examiner

METHOD FOR INCORPORATING NON-OPERATING STATION INTO OPERATING SYSTEM IN MULTI-TERMINAL FLEXIBLE DC TRANSMISSION SYSTEM

CROSS REFERENCE TO RELATED APPLICATIONS

This application is the national phase of International Application No. PCT/CN2014/075653, filed on Apr. 18, 2014 which is based upon and claims priority to Chinese Patent Application No. 2013100597671, filed on Feb. 26, 2013, the entire contents of which are incorporated herein by reference.

TECHNICAL FIELD

The invention falls within the technical field of power electronics, and in particular relates to a method for incorporating a non-operating station into an operating system in a multi-terminal flexible direct current (DC) transmission system.

BACKGROUND

With the progress of the power electronic devices and the control technology, the flexible DC capacity and voltage level are getting higher and higher. Multi-terminal flexible DC transmission is more advantageous in operation flexibility and reliability than two-terminal flexible DC transmission, and moreover, building the multi-terminal flexible DC transmission can meet the requirements of grid interconnection, power supply of urban power grids, and interconnection of multiple wind power plants (new energy resources), which has a great significance. However, the multi-terminal flexible DC transmission system is more complex and higher in operational requirements than the two-terminal flexible DC transmission. It is a focus in industry as regards how to keep the multi-terminal flexible DC transmission system to operate safely and reliably, and in particular, there has not yet been a good solution for connecting a non-operating station to an operating system in a multi-terminal flexible DC transmission system. At present, to connecting a non-operating station to an operating system, the operating system is firstly out of operation, and then the entire multi-terminal flexible DC transmission system is restarted. This method has the following disadvantages:

(1) the outage probability of the multi-terminal flexible DC transmission system is increased;

(2) if the operating system is connected to an important load, a significant loss will be caused;

(3) if the operating system is connected to a new energy source, such as a wind power plant, the new energy resource is caused to be out of operation and put into operation again, thus reducing the energy utilization rate.

In order to improve the stability and reliability of the multi-terminal flexible DC transmission and give full play to the advantages of the multi-terminal flexible DC transmission, there is a need for a more effective control method for incorporating a non-operating station into an operating system, and the present application is developed for this purpose.

SUMMARY

An object of the present invention is to provide a method for incorporating a non-operating station into an operating system in a multi-terminal flexible DC transmission system, which can, through a simple sequential operation and control, avoid the defect of the method by which the an original non-operating station can only be incorporated into a multi-terminal system when the entire multi-terminal flexible DC transmission system is out of operation, and can also effectively suppress AC and DC overcurrent produced when the non-operating station is being incorporated into the operating station in the case where the operating system is not out of operation and the original non-operating station is incorporated into the operating system, so that the non-operating station can be incorporated into the grid safely and reliably.

In order to achieve the above purpose, the solution of the present invention is:

a method for incorporating a non-operating station into an operating system in a multi-terminal flexible DC transmission system, the multi-terminal flexible DC transmission system comprising converter stations connected by a DC line, which have three or more terminals, wherein a DC side of each of the converter stations comprises a pole-connection device, and an AC side thereof comprises an AC incoming-line breaker, a transformer and a charging resistor connected in series with one another, two ends of said charging resistor being further connected in parallel with a bypass switch; and said operating system refers to a healthy operating system in the multi-terminal flexible DC transmission system except for the non-operating station, said method comprising the following steps:

(1) a step including the following two parts operated in any order:

(a) selecting a STATCOM operation mode for the non-operating station;

(b) opening the bypass switch at the AC side of the non-operating station, and connecting the charging resistor to an AC line; closing the AC incoming-line breaker, and pre-charging a converter valve of the non-operating station through the charging resistor; closing the bypass switch after the pre-charging is completed;

(2) selecting a constant-DC voltage control mode for the non-operating station so as to carry out deblocking;

(3) controlling the difference between a non-operating station DC voltage value and an operating system direct voltage value to be within an allowable range;

(4) closing the pole-connection device at the DC side of a convener of the non-operating station; and (5) switching the non-operating station from the STATCOM operation mode to a DC operation mode; and (6) incorporating the non-operating station into the operating system.

In part (b) of the above-mentioned step (1), a flag for the completion of the pre-charging is that the non-operating station's DC voltage is 1.15-1.7 times of an effective value of the AC line voltage at the valve side and remains stable.

In the above-mentioned step (3), the allowable range of the difference has an absolute value less than or equal to 5 kV.

The AC side of the above-mentioned non-operating station is an active system.

The above-mentioned operating system comprises two or more converter stations.

The above-mentioned non-operating station is one converter station or several converter stations in the multi-terminal flexible DC transmission system.

When several non-operating stations are included, each non-operating station is incorporated successively in any order.

By means of the above-mentioned solution, the present invention has the beneficial effects as follows:

(1) the method for incorporating a non-operating station into an operating system in a multi-terminal flexible DC transmission system provided in the present invention avoids the forced outage of a healthy operating station;

(2) the method for incorporating a non-operating station into an operating system in a multi-terminal flexible DC transmission system provided in the present invention can effectively suppress AC and DC overcurrent produced when the non-operating station is being incorporated into the operating station; and (3) the method for incorporating a non-operating station into an operating system in a multi-terminal flexible DC transmission system provided in the present invention is suitable for the engineering application of a multi-terminal flexible DC transmission system, and is simple in operation and effective in control.

DETAILED DESCRIPTION OF THE EMBODIMENTS

The technical solution of the present invention will be described in detail below with reference to the accompanying drawings and specific embodiments.

The multi-terminal flexible DC transmission system present to which the present invention is directed comprises converter stations connected by a DC line, which have three or more terminals, wherein a DC side of each of the converter stations comprises a pole-connection device, and an AC side thereof comprises an AC incoming-line breaker, a transformer and a charging resistor connected in series with one another, two ends of said charging resistor being further connected in parallel with a bypass switch; and said operating system refers to a healthy operating system in the multi-terminal flexible DC transmission system except for the non-operating station, which has two or more converter stations.

Figure 1:
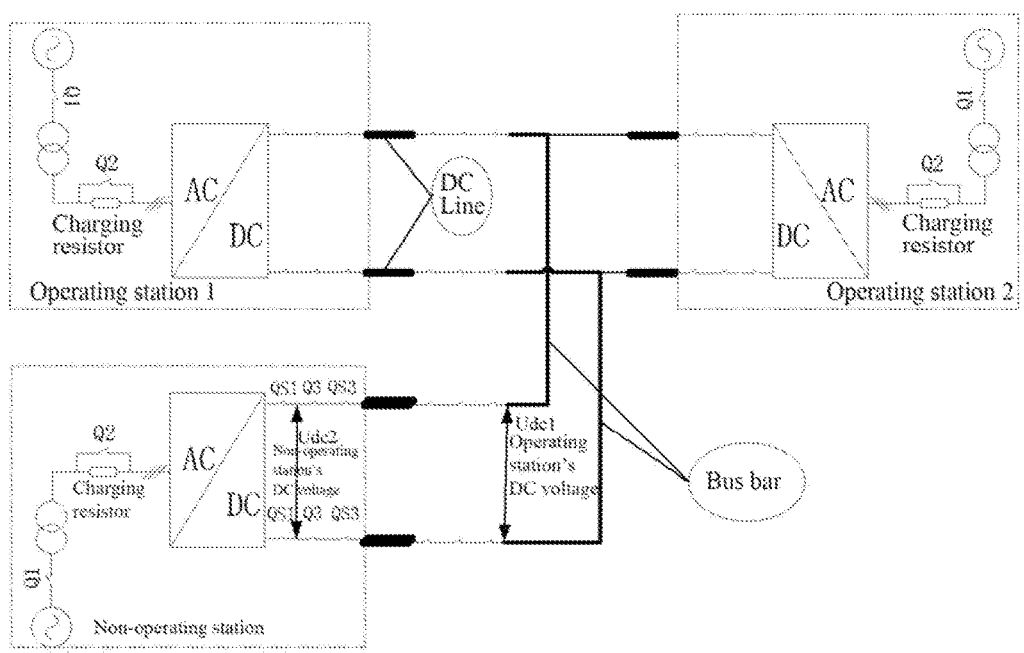
FIG. 1 is a schematic diagram of a multi-terminal flexible DC transmission system (a three-terminal flexible DC transmission system is illustrated as an example) comprising a non-operating system and an operating system.
Figure 2:
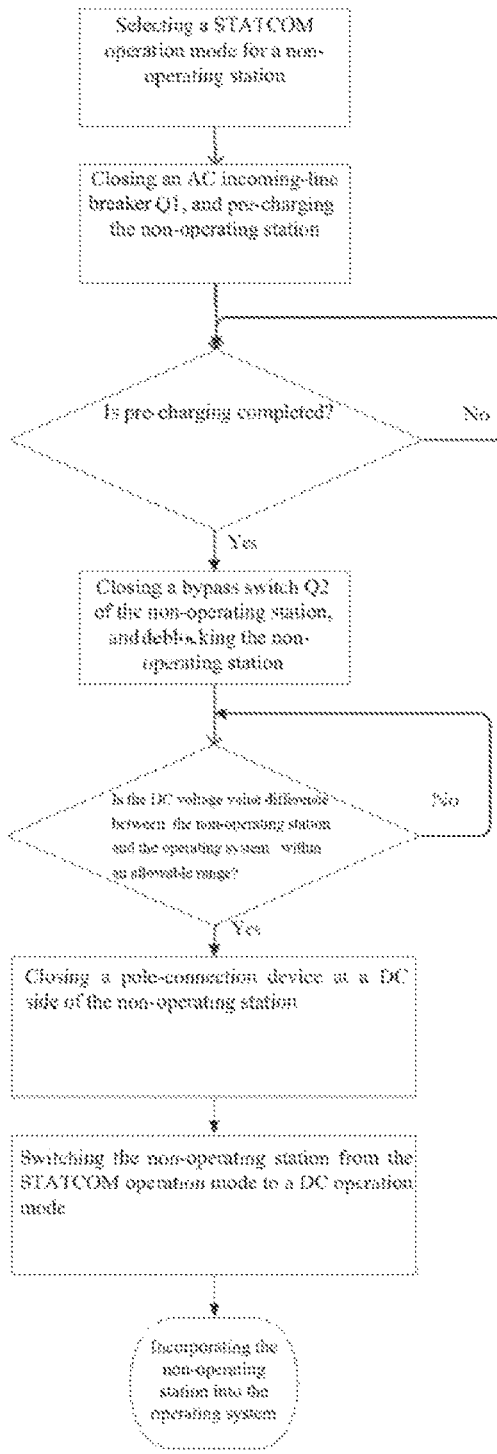
FIG. 2 is an operation flow chart of the present invention.

FIG. 1 shows a three-terminal flexible DC transmission system, in which an operating station 1 and an operating station 2 are operating in a DC mode at both ends, and a non-operating station is in an out-of-operation state. In order to achieve the effect of not causing the operating system to be out of operation while reducing AC and DC current rush on the operating system, the method for incorporating the non-operating station into the operating system in the multi-terminal flexible DC transmission system is carried out in the steps shown in FIG. 2:

(1) closing disconnector-switch QS1 at the DC side of a converter of the non-operating station, and closing disconnector-switch QS3 at the DC side of the converter of the non-operating station, the closing of QS1 and QS3 being in any order;

(2) selecting a STATCOM operation mode for the non-operating station, in which said STATCOM operation mode refers to a parallel static reactive power compensation mode, an active power control mode is selected as a constant-DC voltage control, and a reactive power control mode is selected as a constant reactive power control/constant-AC voltage control;

(3) opening a bypass switch Q2 at the alternating current (AC) side and connecting the charging resistor to an AC line; closing the AC incoming-line breaker Q1, wherein the AC side of the non-operating station is an active system, and pre-charging a converter valve of the non-operating station through the charging resistor; and when a pre-charging voltage reaches a voltage which is 1.15-1.7 times of the AC line voltage and remains stable, which indicates that the pre-charging is completed, closing the bypass switch Q2 of the charging resistor, wherein it should be noted, here that the aforementioned steps (1) to (3) can be operated in any order.

(4) selecting a constant-DC voltage control mode for the non-operating station so as to carry out deblocking;

(5) controlling the difference ΔU between a non-operating station DC voltage value and an operating system direct voltage value to be within an allowable range, where ΔU≤5 kV.

(6) closing a circuit breaker Q3 at the DC side of the converter of the non-operating station; and (7) switching the non-operating station from the STATCOM operation mode to a DC operation mode, and incorporating the non-operating station into the operating system.

When several non-operating stations all need to be incorporated into the operating system, each non-operating station can be incorporated successively in accordance with the aforementioned method in any order.

In the present invention, an implementation is introduced taking a three-terminal flexible DC transmission system as an example, but the present invention is not limited to the three-terminal system and is applicable to a multi-terminal flexible DC transmission system having three or more terminals. Any method involving determining that the difference between the non-operating station voltage and the operating system voltage is within an allowable range, closing a DC circuit breaker switch, and then switching the non-operating station from a DC voltage control mode to an active power control mode falls within the scope of the present invention.

The above embodiments are merely illustrative of the technical idea of the present invention and are not intended to limit the scope of the present invention, and any modification made on the basis of the technical solutions according to the technical idea set forth in the present invention falls within the scope of the present invention.

What is claimed is:

1. A method for incorporating a non-operating station into an operating system in a multi-terminal flexible DC transmission system, the multi-terminal flexible DC transmission system comprising a plurality of converter stations connected by a DC line, which have three or more terminals, wherein a DC side of each of the plurality of converter stations comprises a pole-connection device, and an AC side of each of the plurality of converter stations comprises an AC incoming-line breaker, a transformer connected in series with the AC incoming-line breaker, and a charging resistor connected in series with the transformer, two ends of said charging resistor being further connected in parallel with a bypass switch; and wherein said operating system refers to a healthy operating system in the multi-terminal flexible DC transmission system except for the non-operating station, wherein said method comprises:

(1) selecting a STATCOM operation mode for the non-operating station;

opening the bypass switch at the AC side of the non-operating station and connecting the charging resistor of the non-operating station to an AC line; closing the AC incoming-line breaker of the non-operating station and pre-charging a converter valve of the non-operating station through the charging resistor; and closing the bypass switch of the non-operating station after completion of the pre-charging;

(2) selecting a constant-DC voltage control mode for the non-operating station;

(3) controlling a difference between a DC voltage value of the non-operating station and a DC voltage value of the operating system to be within a predetermined range;

(4) closing the pole-connection device at the DC side of a converter of the non-operating station;

(5) switching the non-operating station from the STATCOM operation mode to a DC operation mode; and (6) incorporating the non-operating station into the operating system.

2. The method for incorporating the non-operating station into the operating system in the multi-terminal flexible DC transmission system of claim 1, wherein the pole-connection device at the DC side can be any combination of a disconnector and a circuit breaker.

3. The method for incorporating the non-operating station into the operating system in the multi-terminal flexible DC transmission system of claim 1, wherein in said step (1), an indication for the completion of the pre-charging is that a DC voltage of the non-operating station is 1.15-1.7 times of an effective value of a voltage of the AC line at the converter valve and remains stable.

4. The method for incorporating the non-operating station into the operating system in the multi-terminal flexible DC transmission system of claim 1, wherein, in said step (3), the predetermined range of the DC voltage value difference has an absolute value less than or equal to 5 kV.

5. The method for incorporating the non-operating station into the operating system in the multi-terminal flexible DC transmission system of claim 1, wherein the AC side of said non-operating station is an active system.

6. The method for incorporating the non-operating station into the operating system in the multi-terminal flexible DC transmission system of claim 1, wherein said operating system comprises two or more converter stations.

7. The method for incorporating the non-operating station into the operating system in the multi-terminal flexible DC transmission system of claim 1, wherein said non-operating station is one converter station or several converter stations in the multi-terminal flexible DC transmission system.

8. The method for incorporating the non-operating station into the operating system in the multi-terminal flexible DC transmission system of claim 1, wherein, when several non-operating stations are included, each non-operating station is incorporated successively in any order.

\* \* \* \* \*